(12) United States Patent
Russo

(10) Patent No.: US 11,868,938 B1
(45) Date of Patent: Jan. 9, 2024

(54) METHOD AND AN APPARATUS FOR DETERMINING A GREENHOUSE GAS IMPACT OF OPERATOR MANEUVER

(71) Applicant: PITT-OHIO, Pittsburgh, PA (US)

(72) Inventor: Justine A. Russo, Pittsburgh, PA (US)

(73) Assignee: PITT-OHIO, Pittsburgh, PA (US)

( * ) Notice: Subject to any disclaimer, the term of this patent is extended or adjusted under 35 U.S.C. 154(b) by 0 days.

(21) Appl. No.: 17/945,741

(22) Filed: Sep. 15, 2022

(51) Int. Cl.
*G06Q 10/0637* (2023.01)
*G06N 20/00* (2019.01)

(52) U.S. Cl.
CPC ....... *G06Q 10/06375* (2013.01); *G06N 20/00* (2019.01)

(58) Field of Classification Search
CPC .............................................. G06Q 10/06375
See application file for complete search history.

(56) References Cited

U.S. PATENT DOCUMENTS

| | | | | |
|---|---|---|---|---|
| 8,346,595 B2 * | 1/2013 | Ben-Hamida | .......... | G06Q 10/08 705/400 |
| 8,498,818 B1 * | 7/2013 | Jones, Jr. | ............. | G06Q 10/083 702/182 |
| 8,892,341 B2 | 11/2014 | McClellan | | |
| 9,824,365 B2 * | 11/2017 | Bradley | .................. | B67D 7/42 |
| 11,214,264 B2 | 1/2022 | Chauncey | | |
| 2007/0233502 A1 * | 10/2007 | Richards | .......... | G06Q 10/06375 705/7.37 |
| 2009/0287520 A1 * | 11/2009 | Zimmerman | .......... | G06Q 10/04 707/999.107 |
| 2009/0292617 A1 * | 11/2009 | Sperling | ................ | G06Q 30/06 705/26.1 |
| 2010/0145569 A1 * | 6/2010 | Bourque | ............ | G01C 21/3469 701/31.4 |
| 2011/0184784 A1 * | 7/2011 | Rudow | .............. | G06Q 10/0639 701/29.6 |
| 2012/0239462 A1 | 9/2012 | Pursell | | |
| 2013/0204471 A1 * | 8/2013 | O'Connell | .............. | B60L 53/68 701/22 |
| 2014/0138478 A1 * | 5/2014 | Cox | ...................... | B64C 25/405 244/50 |
| 2016/0098729 A1 * | 4/2016 | Bradley | ................. | B60K 15/04 701/123 |
| 2017/0084172 A1 * | 3/2017 | Rolle | ................... | G08G 1/0129 |
| 2018/0266919 A1 * | 9/2018 | Furukawa | ........... | G01M 15/102 |
| 2020/0055525 A1 | 2/2020 | Zeng | | |

(Continued)

*Primary Examiner* — Ramsey Refai
(74) *Attorney, Agent, or Firm* — Caldwell Intellectual Property Law

(57) ABSTRACT

An apparatus and method for tracking greenhouse gas impact is disclosed. The apparatus may include at least a processor, and a memory communicatively connected to the at least a processor. The memory contains instructions configuring the at least a processor to receive operation data, determine a portion of the operation data pertaining to an inefficient maneuver, wherein determining the portion of the operation data includes classifying each of the operation data to maneuver efficiency category and determining the portion of the operation data pertaining to the inefficient maneuver as a function of the maneuver efficiency category. The memory further contains instructions configuring the at least a processor to calculate greenhouse gas impact for the inefficient maneuver data.

18 Claims, 6 Drawing Sheets

(56) References Cited

U.S. PATENT DOCUMENTS

| | | |
|---|---|---|
| 2020/0200649 A1* | 6/2020 | Ammoura ............. B60W 40/09 |
| 2020/0284600 A1* | 9/2020 | Oliver Gomila .... G06Q 30/018 |
| 2020/0372588 A1* | 11/2020 | Shi ........................... G06N 3/08 |
| 2021/0248523 A1* | 8/2021 | Wick ..................... G06N 20/00 |
| 2021/0354704 A1 | 11/2021 | Simoncini |
| 2022/0067751 A1* | 3/2022 | Sanchez ............. G06F 16/9535 |
| 2022/0188856 A1* | 6/2022 | Leung ................ G01C 21/3469 |

\* cited by examiner

METHOD AND AN APPARATUS FOR DETERMINING A GREENHOUSE GAS IMPACT OF OPERATOR MANEUVER

FIELD OF THE INVENTION

The present invention generally relates to the field of tracking greenhouse gas impact. In particular, the present invention is directed to a method and an apparatus for determining a greenhouse gas impact of operator maneuver.

BACKGROUND

Greenhouse gas emission from transportation is the largest contributor of the United States greenhouse gas emission. With rising greenhouse gas emission and increased global warming, it is important to examine greenhouse gas impact and decrease the greenhouse gas emission. Thus, determining a greenhouse gas impact of an operator's maneuver of a transport vehicle is valuable to reduce the greenhouse gas emission. Existing solutions to this problem are not sufficient.

SUMMARY OF THE DISCLOSURE

In an aspect, an apparatus for determining a greenhouse impact of operator maneuver, the apparatus including at least a processor and a memory communicatively connected to the at least a processor, the memory containing instructions configuring the at least a processor to receive operation data. The memory containing instructions further configuring the at least a processor to determine a portion of the operation data pertaining to an inefficient maneuver, wherein determining the portion of the operation data includes classifying each of the operation data to maneuver efficiency category and determining the portion of the operation data pertaining to the inefficient maneuver as a function of the maneuver efficiency category. The memory containing instructions further configuring the at least a processor to calculate a greenhouse gas impact for the inefficient maneuver.

In another aspect, a method for determining a greenhouse gas impact of operator maneuver, the method including receiving, using at least a processor, operation data. The method further including determining, using the at least a processor, a portion of the operation data pertaining to an inefficient maneuver wherein determining the portion of the operation data includes classifying each of the operation data to maneuver efficiency category and determining the portion of the operation data pertaining to the inefficient maneuver as a function of the maneuver efficiency category. The method further including calculating, using the at least a processor, greenhouse gas impact for inefficient maneuvers.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for tracking a greenhouse gas impact. The apparatus may comprise at least a processor, and a memory communicatively connected to the at least a processor. The memory contains instructions configuring the at least a processor to receive operation data. Aspects of the present disclosure can be used to determine a portion of operation data pertaining to an inefficient maneuver. In an embodiment, each of operation data may be classified to maneuver efficiency category. In an embodiment, the operation data may be classified to the maneuver efficiency category using a maneuver machine-learning model. In an embodiment, a portion of the operation data pertaining to the inefficient maneuver as a function of the maneuver efficiency category.

Aspects of the present disclosure allow for calculating a greenhouse gas impact for the inefficient maneuver. In an embodiment, the greenhouse gas impact may be calculated using an impact machine-learning model. Exemplary embodiments illustrating aspects of the present disclosure are described below in the context of several specific examples.

Figure 1:
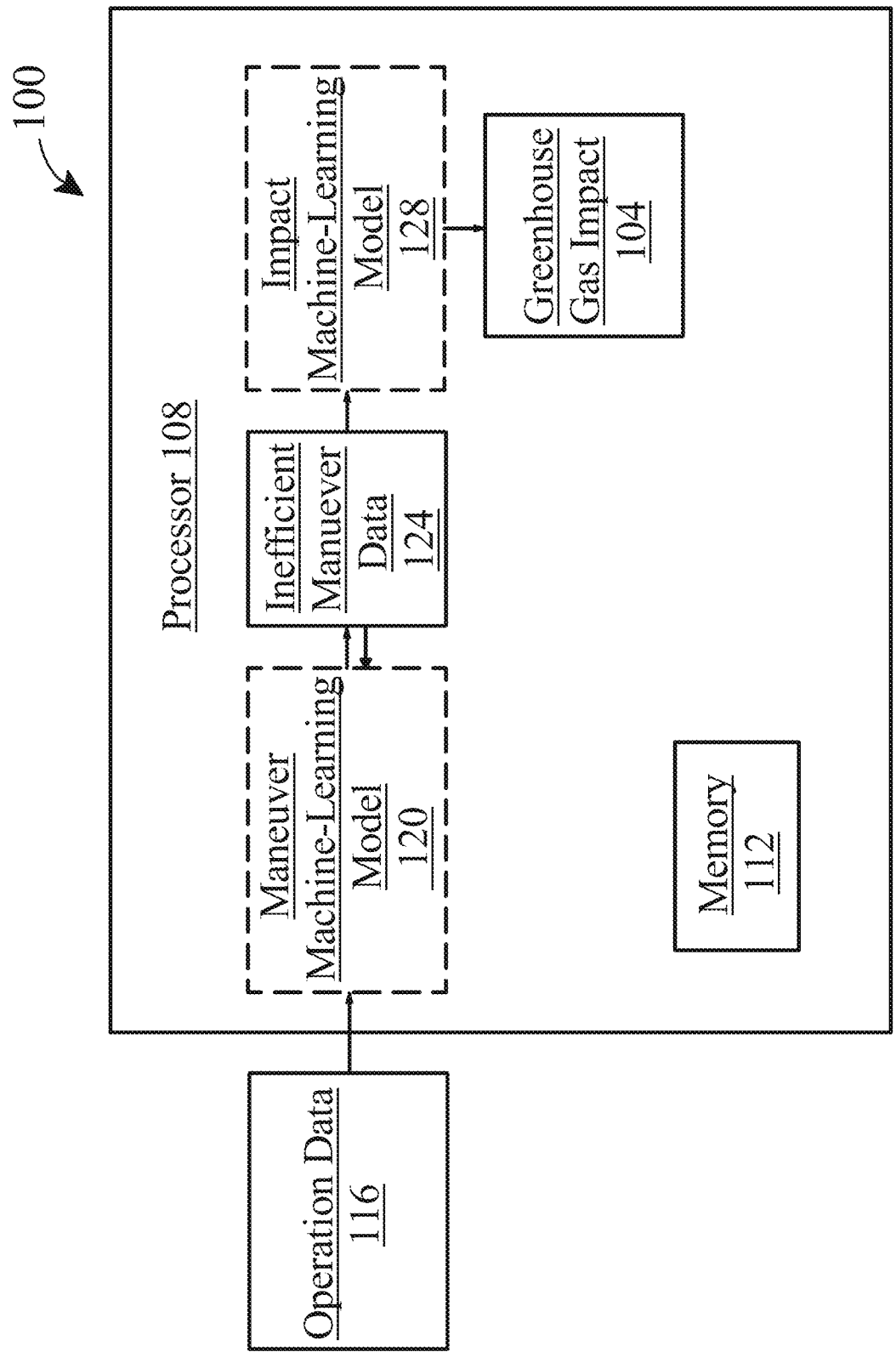
FIG. 1 is a block diagram of an exemplary embodiment of an apparatus for tracking greenhouse gas impact.

Referring now to FIG. 1, an exemplary embodiment of an apparatus 100 for tracking greenhouse gas impact is illustrated. As a non-limiting example, apparatus 100 may track greenhouse gas impact 104. Apparatus 100 includes a processor 108. Processor 108 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 108 may include a single computing device operating independently, or may include two or more computing device operating in concert, in parallel, sequentially or the like; two or more computing devices may be included together in a single computing device or in two or more computing devices. Processor 108 may interface or communicate with one or more additional devices as described below in further detail via a network interface device. Network interface device may be utilized for connecting processor 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented using a "shared nothing" architecture in which data is cached at the worker, in an embodiment, this may enable scalability of system 100 and/or computing device.

Still referring to FIG. 1, processor 108 may be designed and/or configured to perform any method, method step, or sequence of method steps in any embodiment described in this disclosure, in any order and with any degree of repetition. For instance, processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 contains a memory 112 communicatively connected to at least a processor 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, the memory 112 contains instructions configuring the processor 108 to receive operation data 116. For the purposes of this disclosure, "operation data" is data relating to the use of a transport vehicle by an operator. For the purposes of this disclosure, an "operator" is a person that uses or controls a transport vehicle. As a non-limiting example, an operator may be a truck driver, a boat pilot, a plane pilot, a biker, a courier and the like. For the purposes of this disclosure, "transport vehicle" is a device that is capable of moving one or more objects between one or more locations. As a non-limiting example, the transport vehicle may include a freight carrier, a truck, a car, a boat, a plane, a motorcycle, a non-motorized bicycle, and the like. As a non-limiting example, an object may include cargo, goods, livestock, non-fungible goods, fungible goods, produce, cargo containers, oil, liquids, gasoline, food, meals, people, products, and the like. The transport vehicle may be configured to operate through air, land, sea, and/or the like. The transport vehicle may be configured to engage in one or more steps of a transport. In some embodiments, the transport vehicle may engage in pickup, delivery, and/or line haul operations. In some embodiments, the transport vehicle may include, but is not limited to, less than Truckload ("LTL") and/or Full Truckload ("FTL") freight delivery.

Still referring to FIG. 1, the operation data 116 may include, in some embodiments, transport data. For the purposes of this disclosure, "transport data" is data related to the movement of goods, services, and/or equipment by a transport vehicle. The transport data may include moving goods, services, and or equipment from a first location to a second location. The movement of goods may occur via ground, water, air transport, or any combination thereof. In some embodiments, the transport data may include data as a function of time over a course of a transport. In some embodiments, transport data may include transport routes. "Transport routes", for the purposes of this disclosure, is a planned and/or developed path by which transports can be channeled. As a non-limiting example, a transport route may be a path from Ronks, Pennsylvania to Mount Joy, Pennsylvania. Transport data, in some embodiments, may include fuel usage. "Fuel usage", for the purposes of this disclosure, is amount of fuel consumed by a transport vehicle driving a given distance. Fuel may include, but is not limited to, gasoline, diesel, propane, liquefied natural gas, and/or other fuel types. In some embodiments, the transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, biofuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle. Transport data, in some embodiments, may include duration of transporting goods from one location to another location. Transport data, in some embodiments, may include distance of transporting goods from one location to another location.

Still referring to FIG. 1, the operation data 116 may include, in some embodiments, an operator maneuver data. For the purposes of this disclosure, "operator maneuver data" is data relating to the actions of an operator while operating a transport vehicle. In some embodiments, the operator maneuver data may include throttle data. "Throttle data", for the purposes of this disclosure, is data regarding the operation of a throttle. A throttle regulates how much air can go into an engine, based on an operator input through a gas pedal. As more air flows into the engine, more fuel gets injected, allowing for more power. A throttle valve may be controlled by a cable or by an electric motor. In some embodiments, throttle percentage data may be obtained by a throttle position sensor (TPS). "Throttle percentage", for the purposes of this disclosure, is a percentage of a position of the throttle. As a non-limiting example, the throttle percentage may be 5% at idle. A "throttle position sensor (TPS)", for the purposes of this disclosure, is a sensor located in the throttle body to monitor the throttle position of a vehicle. In some embodiments, the throttle data may include the throttle percentage that is being applied as a function of time over a course of a transport. As a non-limiting example, the throttle data may show average throttle percentage of 52% as 4 hours of a transport. In some embodiments, the operator maneuver data may include steering wheel data. "Steering wheel data", for the purposes of this disclosure, is data regarding an operation of a steering wheel. In some embodiments, the steering wheel data may include an angle of the steering wheel as a function of time of a course of a transport. As a non-limiting example, the steering wheel data may show 92 degrees for an angle of the steering wheel at a time of 4 pm during a transport. In some embodiments, the operator maneuver data may include speed data. "Speed data," for the purposes of this disclosure, is data related to speed of a transport vehicle during a transport. As a non-limiting example, the speed data of a transport ship may be 20 knots (23 miles per hour). In some embodiments, the operator maneuver data may include distance data. "Distance data", for the purposes of this disclosure, is data related to distance of a vehicle traveled during a transport. As a non-limiting example, the distance data of a transport truck may be 500 miles. In some embodiments, the operator maneuver data may include brake data. "Brake data", for the purposes of this disclosure, is regarding the slowing or stopping a moving vehicle. In some embodiments, the brake data may include frequencies of pressuring a brake of a transport vehicle. As a non-limiting example, the brake data of a transport truck may include 168 times pressing a brake during a transport from Ronks, Pennsylvania to Mount Joy, Pennsylvania. In some embodiments, the brake data may include time spent on pressing a brake. As a non-limiting example, the brake data of a transport truck may include 11 seconds of pressing a brake. In some embodiments, the brake data may include strength of actuation of a brake. As a non-limiting example, the brake data of a transport truck may include 80 lbs. of force while pressing a brake pedal hard. As another limiting example, the brake data of a transport truck may include 10 lbs. of force while pressing a brake pedal soft. In some embodiments, brake data may include a percentage of the actuation of a brake pedal. For example, brake data may include data regarding that the brake in a transport vehicle was depressed 52%. In some embodiments, the operator maneuver data may include acceleration data. "Acceleration data", for the purposes of this disclosure, is data related to a rate at which a vehicle can increase its speed. As a non-limiting example, the acceleration data of a transport motorcycle may be 10 m/s$^2$ acceleration rate at 2 o'clock during a transport. In some embodiments, the operator maneuver data may include idling data. "Idling data", for the purposes of this disclosure, is data related to time leaving a vehicle's engine running while the vehicle is not in motion. As a non-limiting example, the idling data may be 20 mins of idling a transport vehicle in the middle of transport.

Still referring to FIG. 1, the memory 112 contains instructions configuring the processor 108 to receive operation data 116. In some embodiments, the processor 108 may receive the operation data 116 from a database. "Database", for the purposes of this disclosure, is an organized collection of data stored and accessed electronically. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, the database may receive the operation data 116 from a transport vehicle. The database may receive the operation data 116, as a non-limiting example, such as strength of actuation of a brake as pressure data. In another embodiment, the database may receive the operation data 116 as a result of manual input by an operator. The database may receive the operation data 116, as a non-limiting example, such as a type of a transport vehicle input by an operator of the vehicle.

Still referring to FIG. 1, in some embodiments, the processor 108 may receive the operation data 116 detected by one or more sensors. For the purposes of this disclosure, a "sensor" is a device that is configured to detect an input and/or a phenomenon and transmit information related to the detection. In some embodiments, sensors may be communicatively connected to the processor 108. In some embodiments, a sensor may transduce a detected phenomenon and/or characteristic, such as without limitation, temperature, voltage, pressure, and the like, into a sensed signal. Sensors may include one or more sensors which may be the same, similar, or different. In some embodiments, the sensor may include a plurality of sensors. The sensor may be a contact or a non-contact sensor. In some embodiments, the sensor may be an encoder. An "encoder," for the purposes of this disclosure, is a sensing device that converts an angular motion or position into analog or digital output signals. Encoders may convert motion to an electrical signal that can be read by some type of control device in a motion control system, such as a counter or PLC. The encoder may send feedback signal that can be used to determine position, count, speed, direction, and the like. The processor 108 may use this information to send a command for a particular function. As a non-limiting example, the encoder may provide position feedback for throttle percentage data. As a non-limiting example, an encoder may be used to provide position and/or motion data for the position and/or motion of a steering wheel. In some embodiments, the sensor may include a motion sensor. A "motion sensor", for the purposes of this disclosure, refers to a device or component configured to detect physical movement of an object or grouping of objects. For example, and without limitation, motion sensor may detect the movement of vehicle or objects being transported by vehicle, such as, for example, during an unloading or loading process of transport. One of ordinary skill in the art would appreciate, after reviewing the entirety of this disclosure, that motion may include a plurality of types including, but not limited to: spinning, rotating, oscillating, gyrating, jumping, sliding, reciprocating, displacing, or the like. The sensor may include, torque sensor, gyro meter (e.g., gyroscope), accelerometer, magnetometer, inertial measurement unit (IMU), pressure sensor, force sensor, proximity sensor, displacement sensor, vibration sensor, LIDAR sensor, and the like thereof. In a nonlimiting embodiment, the sensor ranges may include a technique for the measuring of distances or slant range from an observer including the sensor to a target which may include a plurality of outside parameters. An "outside parameter," for the purposes of this disclosure, refers to environmental factors or physical vehicle factors that may be further captured by the sensor. Outside parameter may include, but is not limited to, air density, air speed, true airspeed, relative airspeed, current patterns, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of vehicle itself, including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, speed, debris, among others. Environmental parameters may be stored in any suitable datastore consistent with this disclosure. Technique may include the use of active range finding methods which may include, but not limited to, light detection and ranging (LIDAR), radar, sonar, ultrasonic range finding, and the like. LIDAR systems may include, but are not limited to, a laser, at least a phased array, at least a microelectromechanical machine, at least a scanner and/or optic, a photodetector, GPS, and the like. In a non-limiting embodiment, the sensor including a LIDAR system may target an object with a laser and measure the time for at least a reflected light to return to the LIDAR system. LIDAR may also be used to make digital 4D representations of areas on the earth's surface and ocean bottom, due to differences in laser return times, and by varying laser wavelengths. In a nonlimiting embodiments, LIDAR system may include a topographic LIDAR and a bathymetric LIDAR, wherein the topographic LIDAR that may use near-infrared laser to map a plot of a land or surface representing a potential checkpoint or travel route of vehicle while the bathymetric LIDAR may use water-penetrating green light to measure seafloor and various water level elevations within and/or surrounding destination or route.

Still referring to FIG. 1, in some embodiments, the processor 108 may receive the operation data 116 detected by one or more sensors. In some embodiments, the sensor may include a pressure sensor. "Pressure", for the purposes of this disclosure, is a measure of force required to stop a fluid from expanding and is usually stated in terms of force per unit area. In nonlimiting exemplary embodiments, the pressure sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressure sensor may include a barometer. In some embodiments, the pressure sensor may be used to indirectly measure fluid flow, speed, water level, and altitude. In some embodiments, the pressure sensor may be configured to transform the pressure into an analogue electrical signal. In some embodiments, the pressure sensor may be configured to transform the pressure into a digital signal.

Still referring to FIG. 1, in some embodiments, the processor 108 may receive the operation data 116 detected by one or more sensors. In some embodiments, the sensor may include an electrical sensor. "Electrical sensor", for the purposes of this disclosure, may be configured to measure voltage across a component, electrical current through a component, and resistance of a component. In one or more embodiments, the sensor may include thermocouples, thermistors, thermometers, infrared sensors, resistance temperature sensors (RTDs), semiconductor based integrated circuits (ICs), a combination thereof, or another undisclosed sensor type, alone or in combination. "Temperature", for the purposes of this disclosure, is a measure of the heat energy of a system. Temperature, as measured by any number or combinations of the sensors present within the sensor, may be measured in Fahrenheit (° F.), Celsius (° C.), Kelvin (° K), or another scale alone or in combination. The temperature measured by the sensor may include electrical signals, which are transmitted to their appropriate destination wireless or through a wired connection.

Still referring to FIG. 1, in some embodiments, one or more sensors may be connected to steering wheels, tires, exhaust pipes, suspensions, and the like of a transport vehicle. In some embodiments, the sensor may be a contact or a non-contact sensor. In some embodiments, the sensor may generate a sensor signal (also referred to in this disclosure as a "signal") related to detections. Signals may include electrical, electromagnetic, visual, audio, radio waves, or another undisclosed signal type alone or in combination. Any data or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The sensor may include circuitry, computing devices, electronic components or a combination thereof that translates sensor detections into at least an electronic signal configured to be transmitted to another electronic component, such as processor 108. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e. quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e. a stochastic process), utilizing statistical properties. For instance, in some embodiments, the signal may be modeled with a probability distribution indicating noise, which then may be used to reduce noise in a processed signal.

Still referring to FIG. 1, in some embodiments, the sensor may be located within a transport vehicle or a user device. The user device includes a tablet, laptop, smartphone, and the like. The sensor may also be located on the interior or exterior of the transport vehicle. In some embodiments, the processor 108 may receive operation data 116 from the sensor using wireless communication, such as, as non-limiting examples, Wi-Fi, Bluetooth, 3G, 4G, LTE, 5G, cellular data, cellular networks, NFC, radio, and the like.

Still referring to FIG. 1, in some embodiments, the operation data 116 may be transmitted at regular intervals. As a non-limiting example, steering wheel data may be transmitted every 5 minutes, 20 minutes, 1 hour, 2 hours, and the like. In some embodiments, the operation data 116 may be transmitted at a conclusion of a transport. As a non-limiting example, distance of a transport may be transmitted once a transport vehicle has arrived its destination. As another non-limiting example, throttle data may be transmitted once a transport is completed from Boston, Massachusetts to Nashua, New Hampshire. In some embodiments, the operation data 116 may be transmitted continuously. As a non-limiting example, speed data of a transport airplane may be transmitted continuously during a transport. As another non-limiting example, throttle data of a vehicle may be collected continuously during a transport from Boston, Massachusetts to Nashua, New Hampshire. In some embodiments, the operation data 116 may be confined to one trip. As a non-limiting example, steering wheel data may be confined to a trip from Boston, Massachusetts to Nashua, New Hampshire. In some embodiments, the operation data 116 may be confined to multiple trips. As a non-limiting example, steering wheel data may be confined to a trip from Boston, Massachusetts to Nashua, New Hampshire and from Nashua, New Hampshire to Boston, Massachusetts. In some embodiments, the operation data 116 may be confined to an operator's period of employment. The operator's entire period of employment may be 1 day, 12 days, 10 months, 3 years, and the like. As a non-limiting example, steering wheel data may be confined to all trips from Boston, Massachusetts to Nashua, New Hampshire for 10 months of an operator's period of employment.

Still referring to FIG. 1, the memory 112 contains instructions configuring the processor 108 to determine a portion of operation data 116 pertaining to an inefficient maneuver. "Inefficient maneuver", for the purposes of this disclosure, is a driving maneuver that is associated with higher than normal or wasteful greenhouse gas emissions. "Greenhouse gas", for the purposes of this disclosure, is gas that absorbs and emits radiant energy within thermal infrared range, causing greenhouse effect. "Greenhouse effect", for the purposes of this disclosure, is a process that occurs when energy from a planet's host star goes through its atmosphere and warms the planet's surface, but the atmosphere prevents the heat from returning directly to space, resulting in a warmer planet. For example, light arriving from our Sun passes through Earth's atmosphere and warms its surface. The warmed surface then radiates heat, which is absorbed by greenhouse gases such as carbon dioxide. Without the natural greenhouse effect, Earth's average temperature would be well below freezing. Current human-caused increases in greenhouse gases trap greater amounts of heat, causing the Earth to grow warmer over time. The primary greenhouse gases in Earth's atmosphere are water vapor ($H_2O$), carbon dioxide ($CO_2$), methane ($CH_4$), nitrous oxide ($N_2O$), and ozone ($O_3$). An amount of the greenhouse gas generated may be represented in, but is not limited to, metric tons, pounds, kilograms, cubic meters, and the like. As a non-limiting example, the greenhouse gas may be 4 metric tons of carbon dioxide generated by a transport aircraft pilot. A source of greenhouse gas may include, but is not limited to, transport vehicles, combustion from boilers, furnaces, emissions from processes performed by or products manufactured by a transport vehicle, and the like. "Boiler", for the purposes of this disclosure, is where thermal energy of fuel is converted to potential energy in a form of steam for later use by a steam engine. "Furnace", for the purposes of this disclosure, is a source for natural gas heating built inside a vehicle HVAC system. Greenhouse gas data may be consistent with any greenhouse gas data disclosed in U.S. patent application Ser. No. 17/749,535, filed on May 20, 2022, and entitled "SYSTEM AND METHOD FOR GREENHOUSE GAS TRACKING," the entirety of which is incorporated by reference herein in its entirety.

Still referring to FIG. 1, in some embodiments, the inefficient maneuver data 124 may be determined by an operator manually. As a non-limiting example, a truck driver may determine idling for 5 minutes is an inefficient maneuver. As another limiting example, a truck driver may determine an increase of steering wheel angle from 0 degree to 30 degrees in 0.3 seconds is an inefficient maneuver. In some embodiments, the inefficient maneuver data 124 may be determined by comparing the operation data 116 with an average of the operation data 116. In an embodiment, the average of the operation data 116 may be calculated adding a group of values of the operation data 116 and then dividing by a count of the values. In some embodiments, the average of operation data may be calculated using historical operation data, such as operation data from other transport providers, other transports, and the like. As a non-limiting example, an average of the throttle percentage of a heavy-duty transport truck may be calculated as adding 10%, 10%, 11%, 15%, 25%, 75% of collected throttle percentage and dividing the sum by a count of the collected throttle percentage, 6. A resulting average of the operation data 116 of throttle percentage is 24.3%. Then, the operation data 116 of the throttle percentage may be compared with the average of the throttle percentage to determine the inefficient maneuver data 124 of the throttle percentage. As a non-limiting example, the 25% of the throttle percentage may be determined as the inefficient maneuver data 124 as the percentage is above the average of the throttle percentage. In some embodiments, the average of operation data may be used to calculate a threshold value, wherein an operation data above the threshold value would indicate an inefficient maneuver. In some embodiments, the threshold value may be set at the average of operation data. In some embodiments, the threshold value may be set to be 10% higher than the average of the operation data. In some embodiments, the threshold value may be set to be 25% higher than the average of the operation data. In some embodiments, the threshold value may be set to be 5-40% higher than the average of the operation data. In some embodiments, the threshold value may be set to be 10-25% higher than the average of the operation data. In some embodiment, the inefficient maneuver data 124 may be determined by comparing the operation data 116 with a threshold of the operation data 116. In an embodiment, the threshold of the operation data 116 may be determined by an operator manually. As a non-limiting example, a heavy-duty truck driver may determine a threshold for throttle percentage as 30%. Then, any throttle percentage greater or equal to 30% may be determined as the inefficient maneuver.

Still referring to FIG. 1, the memory 112 contains instructions configuring the processor 108 to determine a portion of operation data 116 pertaining to an inefficient maneuver. In some embodiments, the inefficient maneuver may include a large increase in throttle percentage. The large increase in throttle percentage, in another embodiment, may be determined by calculating a difference of a value of a spike in throttle percentage and a value of throttle percentage obtained before the spike and comparing the difference and an average of differences. A "spike" in a throttle percentage, for the purposes of this disclosure, is a sudden increased value of throttle percentage obtained in a short period of time when a vehicle performs acceleration. An "average" of a throttle percentage, for the purposes of this disclosure, is an average of throttle percentage differences. As a non-limiting example, throttle percentage of a heavy-duty truck may be increased from 10% to 76%. The difference of the throttle percentage may be calculated by 76%-10%=66%. An average of throttle percentage differences may be calculated as 60%. As the difference of the spike value is higher than the average of the throttle percentage differences, resulting the large increase in throttle percentage, the throttle percentage may be determined as an inefficient maneuver. In some embodiments, the inefficient maneuver may include a spike in steering wheel angle. A "spike" in steering wheel angle, for the purposes of this disclosure, is a sudden increased angle of a steering wheel obtained in a short period of time when a vehicle performs an abrupt turn. As a non-limiting example, the angle of the steering wheel may increase from 0 degree to 100 degrees in 0.7 seconds during a transport. In some embodiments, the inefficient maneuver may include long idling time. "Long idling time", for the purposes of this disclosure, is time leaving a vehicle's engine running for a long period of time while the vehicle is not in motion. In some embodiments, the long idling time may be determined by comparing an idling threshold and obtained idling time data from a transport vehicle. As a non-limiting example, a long idling time may be an idling time that exceeds an average idling time for a similar transport and/or transport vehicle. An "idling threshold," for the purposes of this disclosure, is a period of idling time that is chosen in advance as an upper limitation. In an embodiment, an idling threshold may be set by an operator manually. As a non-limiting example, an operator of a transport truck may set an idling threshold for 10 seconds. In some embodiments, the inefficient maneuver may include high acceleration. "Acceleration", for the purposes of this disclosure, is the time rate of change of velocity. "High acceleration", for the purposes of this disclosure, is an abrupt starting of an engine of a transport vehicle or an abrupt increase of a power of an engine in a short period of time. As a non-limiting example, an acceleration rate of a vehicle truck may increase from 1 m/s$^2$ to 3 m/s$^2$ in 1 second during a transport. In some embodiments, the inefficient maneuver may include hard braking. "Hard braking", for the purposes of this disclosure, is a maneuver of stopping a vehicle abruptly. As a non-limiting example, a pressure of generated in a brake system in a vehicle may increase from 35 bar (507.5 psi) to 70 bar (1015 psi) in 0.3 seconds. As another non-limiting example, a deceleration rate may increase from 9 ft/sec$^2$ to 15 ft/sec$^2$. "Deceleration", for the purpose of this disclosure, is acceleration that causes reduction in speed. In some embodiments, the inefficient maneuver may include driving with a parking brake on. In some embodiments, the inefficient maneuver may include long taxi-time. "Taxi-time," for the purposes of this disclosure, is a total time of an aircraft's movement on ground. As a non-limiting example, taxi-time may be time an aircraft takes to go from terminal to a runway until cleared for takeoff. As another non-limiting example, taxi-time may be time the aircraft going from exiting the runway back to the terminal. In some embodiments, the long taxi-time may be determined by comparing the taxi-time threshold and obtained taxi-time data from a transport vehicle. A "taxi-time threshold," for the purposes of this disclosure, is a period of taxi-time that is chosen in advance as an upper limitation. In an embodiment, a long-taxi-time threshold may be set by an operator manually. As a non-limiting example, a transport aircraft pilot may set 10 minutes as a taxi-time threshold. In some embodiments, the inefficient maneuver may include taking an inefficient transport route. As a non-limiting example, a sailor may not plan ocean passages with weather routing service. "Weather routing," for the purposes of this disclosure, is a service for cargo ships, to optimize their voyage performance. The weather routing service is used to reduce fuel consumption, improve estimated time of arrival (ETA), protect ships owners from speed claims, and the like. In some embodiments, an inefficient maneuver may include pressing the throttle pedal at the same time that the brake pedal is pressed.

Still referring to FIG. 1, the memory 112 contains instructions configuring the processor 108 to determine a portion of operation data 116 pertaining to an inefficient maneuver. The processor 108 may use a maneuver machine-learning model 120 to classify each of the operation data 116 to a maneuver efficiency category and determine the portion of the operation data 116 pertaining to the inefficient maneuver as a function of the maneuver efficiency category. "Maneuver efficiency category", for the purposes of this disclosure, is a division of the operation data 116 regarding an operator maneuver efficiency. In an embodiment, the maneuver efficiency category may include an efficient maneuver category. An "efficient maneuver category," for the purposes of this disclosure, is a category that contains efficient maneuver of an operator. In some embodiments, the efficient maneuver category may include efficient sub-category. An "efficient sub-category," for the purposes of this disclosure, is a subordinate category that contains a division of efficient maneuver of an operator. In an embodiment, the efficient sub-category may include idling category. As a non-limiting example, the efficient sub-category may include 5 seconds of idling data that is below an idling threshold, 15 seconds, set by a transport truck driver. In another embodiment, the efficient sub-category may include taxi-time category. As a non-limiting example, the efficient sub-category may include taxi-time of 8 minutes that is below a taxi-time threshold, 10 minutes, set by a transport aircraft pilot. In another embodiment, the efficient sub-category may include acceleration category. As a non-limiting example, the efficient sub-category may include average acceleration rate of a transport vehicle. In another embodiment, the efficient sub-category may include throttle category. In a non-limiting example, the efficient sub-category may include average throttle percentage of a heavy-duty transport truck. In some embodiment, the maneuver efficiency category may include an inefficient maneuver category. An "inefficient maneuver category," for the purposes of this disclosure, is a category that contains inefficient maneuver of an operator. In some embodiments, the inefficient maneuver category may include inefficient sub-category. An "inefficient sub-category," for the purposes of this disclosure, is a subordinate category that contains a division of inefficient maneuver of an operator. In an embodiment, the inefficient sub-category may include an idling category. As a non-limiting example, the inefficient sub-category may include 10 minutes of idling time which exceeds an idling threshold, 20 seconds, as set by a heavy-duty transport truck driver. In another embodiment, the inefficient sub-category may include a taxi-time category. As a non-limiting example, the inefficient sub-category may include 30 minutes of taxi-time which exceeds a taxi-time threshold, 10 minutes, as set by a transport aircraft pilot. In another embodiment, the inefficient sub-category may include acceleration category. As a non-limiting example, the inefficient sub-category may include acceleration rate of 3 m/s$^2$ which exceeds an average acceleration rate of 1.5 m/s$^2$ of a heavy-duty transport truck. In another embodiment, the inefficient sub-category may include throttle category. In a non-limiting example, the inefficient sub-category may include 76% of throttle percentage which exceeds an average throttle percentage of 35% of a heavy-duty transport truck. The maneuver machine-learning model 120 may be created using a machine-learning module. The machine-learning module may be consistent with machine-learning module 200 disclosed with reference to FIG. 2. In some embodiments, the maneuver machine-learning model 120 may be generated using training data comprising inputs, such as operation data 116 inputs, correlated to outputs, such as inefficient maneuver data 124 outputs. As a non-limiting example, the maneuver machine-learning model 120 may receive a plurality of steering wheel data of a transport truck as the inputs. The maneuver machine-learning model 120 may classify each of the plurality of the steering wheel data to the maneuver efficiency category. The maneuver machine-learning model 120 may determine inefficient maneuver data 124 from the each of the plurality of the steering wheel data in the maneuver efficiency category. The maneuver machine-learning model 120 may not find the inefficient maneuver data 124 from the operation data 116 inputs. As a non-limiting example, the maneuver machine-learning model 120 may receive a plurality of throttle data of a transport truck as the inputs. The maneuver machine-learning model 120 may classify each of the plurality of the throttle data to the maneuver efficiency category. The maneuver machine-learning model 120 may find no inefficient maneuver data 124 from the each of the plurality of the throttle data in the maneuver efficiency category. "Inefficient maneuver data", for the purposes of this disclosure, is data of a portion of the operation data 116 pertaining to an inefficient maneuver. In some embodiments, the maneuver machine-learning model 120 may be trained using training data. As a non-limiting example, the training data may include inputs including the operation data 116, correlated to including the inefficient maneuver data 124 outputs. As a non-limiting example, the training data may be throttle data. As another non-limiting example, the training data may be steering wheel data.

Still referring to FIG. 1, the memory 112 contains instructions configuring the processor 108 to calculate greenhouse gas impact 104 for the inefficient maneuver data 124. "Greenhouse gas impact" is a measurement of greenhouse gas emissions. In some embodiments, the greenhouse gas impact 104 may include a greenhouse gas emission datum. A "greenhouse gas emission datum," for the purposes of this disclosure, is a datum relating to greenhouse gas emission. In some embodiments, the greenhouse gas emission datum may include a carbon emission datum. A "carbon emission datum" is a datum relating to carbon emissions. As a non-limiting example, the carbon emission datum may include amount of carbon emission gas emitted from a heavy-duty truck transporting goods from one location to a destination. In some embodiments, the greenhouse gas impact 104 may be calculated using a look-up table. A "lookup table", for the purposes of this disclosure, is an array of data that maps input values to output values. The lookup table may be used to replace a runtime computation with an array indexing operation. As a non-limiting example, the lookup table for the greenhouse gas impact 104 may relate the inefficient maneuver data 124 to the greenhouse gas impact 104. The processor 108 may be configured to "lookup" the inefficient maneuver data 124 in order to find a corresponding greenhouse gas impact 104.

Still referring to FIG. 1, in some embodiments, the greenhouse gas impact 104 may be calculated using an impact machine-learning model 128. The impact machine-learning model 128 may be created using a machine-learning module. Machine-learning module may be consistent with machine-learning module 200 disclosed with reference to FIG. 2. As a non-limiting example, the impact machine-learning model 128 may receive the inputs of inefficient maneuver data of steering wheel data and may calculate greenhouse gas impact 104 as a function of the inefficient maneuver data of the steering wheel data. In some embodiments, the impact machine-learning model 128 may be trained using training data. As a non-limiting example, training data may include inputs including inefficient maneuver data 124, correlated to including greenhouse gas impact 104 outputs. As another non-limiting example, training data may include inefficient maneuver data 124 manually labeled by an operator.

Still referring to FIG. 1, in an embodiment, an impact machine-learning model 128 may calculate a carbon emission datum as a function of the amount of fuel that is consumed. In a non-limiting example, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). In another embodiment, the carbon emission datum may be generated as a function of energy generated from the fuel. In a non-limiting example, mass of carbon dioxide that is released when 1 MJ of energy is released from fuel can be estimated to a good approximation. For the chemical formula of diesel, we use as an approximation $C_nH_{2n}$. Note that diesel is a mixture of different molecules. As carbon has a molar mass of 12 g/mol and hydrogen has a molar mass of about 1 g/mol, so the fraction by weight of carbon in diesel is roughly 12/14. The reaction of diesel combustion is given by:

$$2C_nH_{2n} + 3nO_2 \approx 2nCO_2 + 2nH_2O$$

Carbon dioxide has a molar mass of 44 g/mol as it consists of 2 atoms of oxygen (16 g/mol) and 1 atom of carbon (12 g/mol). So, 12 g of carbon yield 44 g of Carbon dioxide. Diesel has an energy content of 42.6 MJ per kg, or 23.47 gram of Diesel contain 1 MJ of energy. Putting everything together the mass of carbon dioxide that is produced by releasing 1 MJ of energy from diesel fuel can be calculated as:

$$23.47 \text{ g} \frac{\text{Diesel}}{MJ} * \frac{12}{14} * \frac{44}{12} = 74 \text{ g (Carbon Dioxide)/MJ}$$

For gasoline, with 22 g/MJ and a ratio of carbon to hydrogen atoms of about 6 to 14, the estimated value of carbon emission for 1 MJ of energy is:

$$22 \text{ g} \frac{\text{gasoline}}{MJ} * \frac{6*12}{6*12 + 14*1} * \frac{44}{12} = 67.5 \text{ g/MJ}$$

The carbon emission datum may be calculated using any method for calculating carbon emission disclosed in patent application Ser. No. 17/945,683, filed on Sep. 15 2022 and entitled "AN APPARATUS FOR IDENTIFYING AN EXCESSIVE CARBON EMISSION VALUE AND A METHOD FOR ITS USE," the entirety of which is incorporated by reference herein.

| Mass of carbon dioxide emitted per quantity of energy for various fuels | | | |
|---|---|---|---|
| Fuel name | $CO_2$ emitted (lbs./$10^6$ Btu) | $CO_2$ emitted (g/MJ) | $CO_2$ emitted (g/kWh) |
| Natural gas | 117 | 50.30 | 181.08 |
| Liquefied petroleum gas | 139 | 59.76 | 215.14 |
| Propane | 139 | 59.76 | 215.14 |
| Aviation gasoline | 153 | 65.78 | 236.81 |
| Automobile gasoline | 156 | 67.07 | 241.45 |
| Kerosene | 159 | 68.36 | 246.10 |
| Fuel oil | 161 | 69.22 | 249.19 |
| Tires/tire derived fuel | 189 | 81.26 | 292.54 |
| Wood and wood waste | 195 | 83.83 | 301.79 |
| Coal (bituminous) | 205 | 88.13 | 317.27 |
| Coal (sub-bituminous) | 213 | 91.57 | 329.65 |
| Coal (lignite) | 215 | 92.43 | 332.75 |
| Petroleum coke | 225 | 96.73 | 348.23 |
| Coal (anthracite) | 227 | 97.59 | 351.32 |

Figure 2:
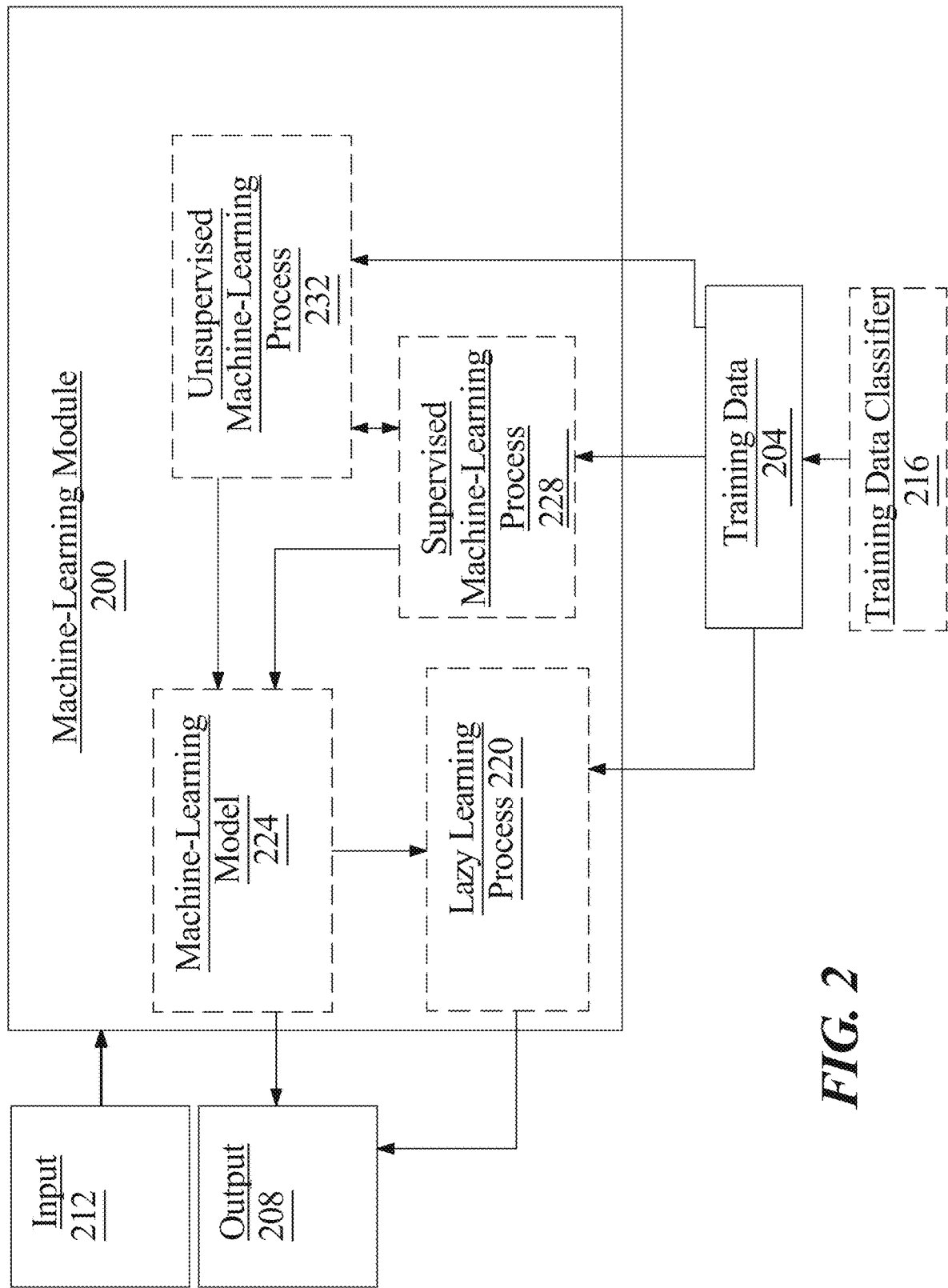
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data.

Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Still referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network including an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include operation data 116 as described above as inputs, inefficient maneuver data 124 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Still referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
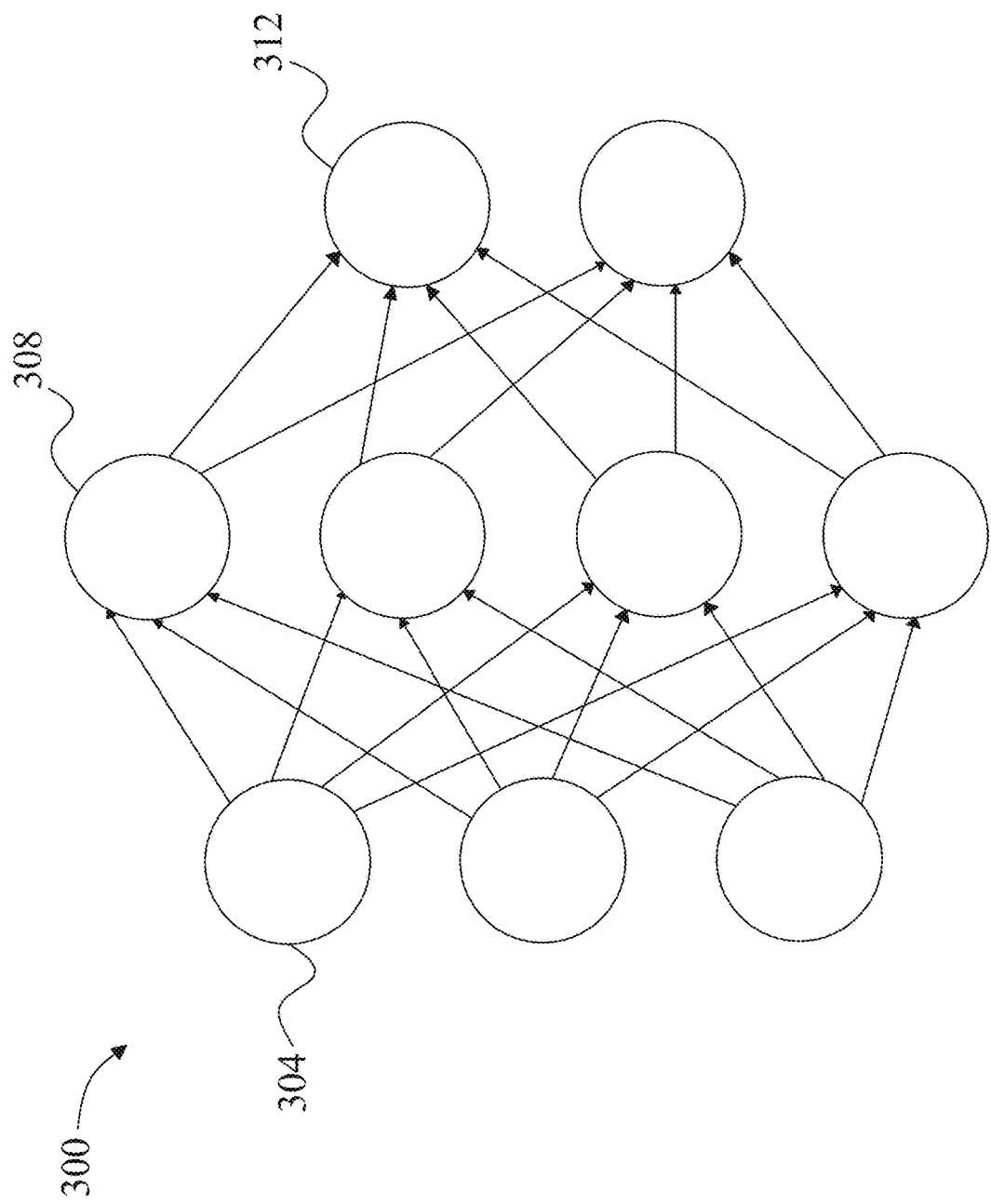
FIG. 3 is a diagram of an exemplary embodiment of neural network.

Referring now to FIG. 3, an exemplary embodiment of neural network 300 is illustrated. "Neural network" also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network including an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
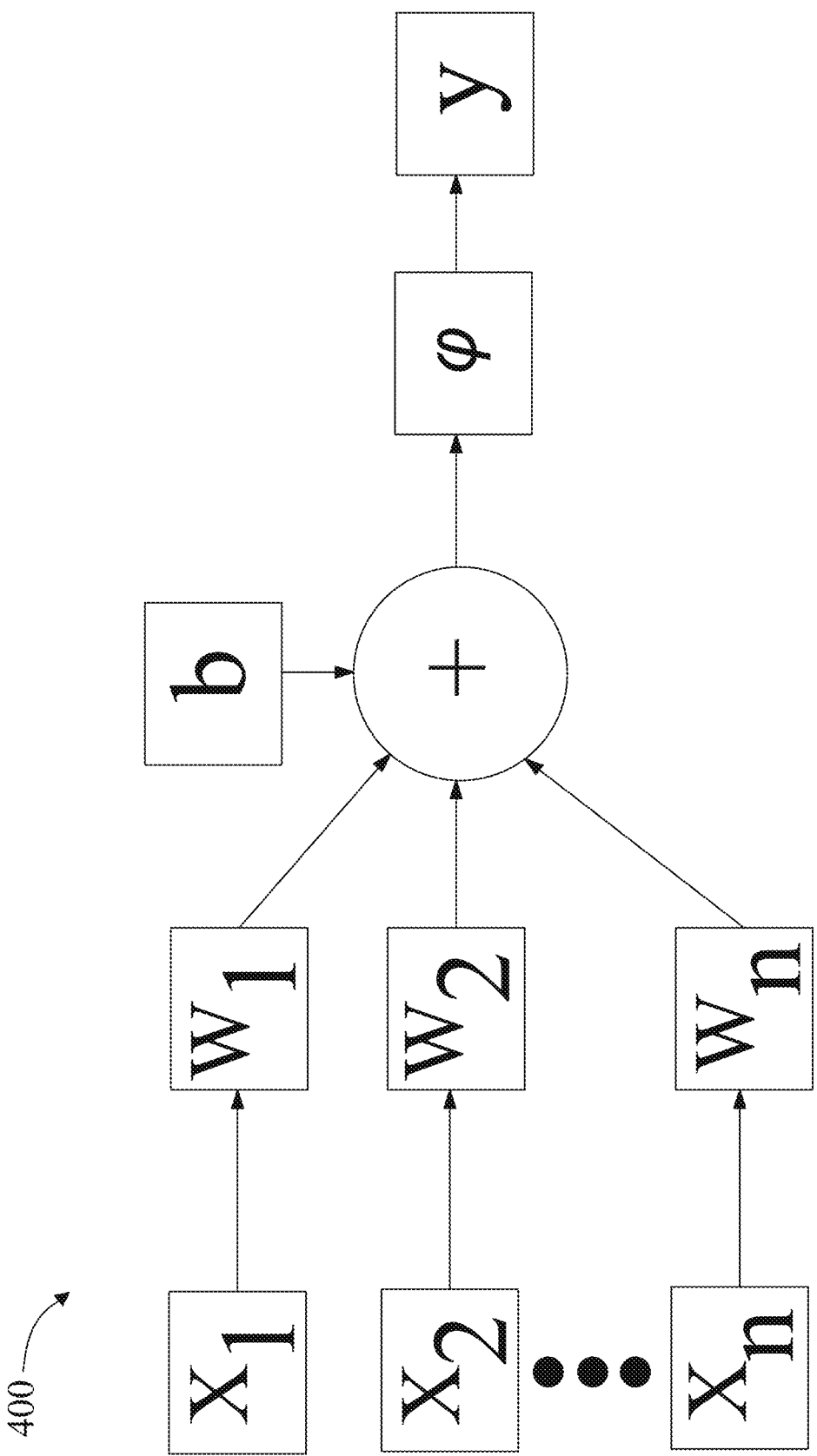
FIG. 4 is a diagram of an exemplary embodiment of a node of a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
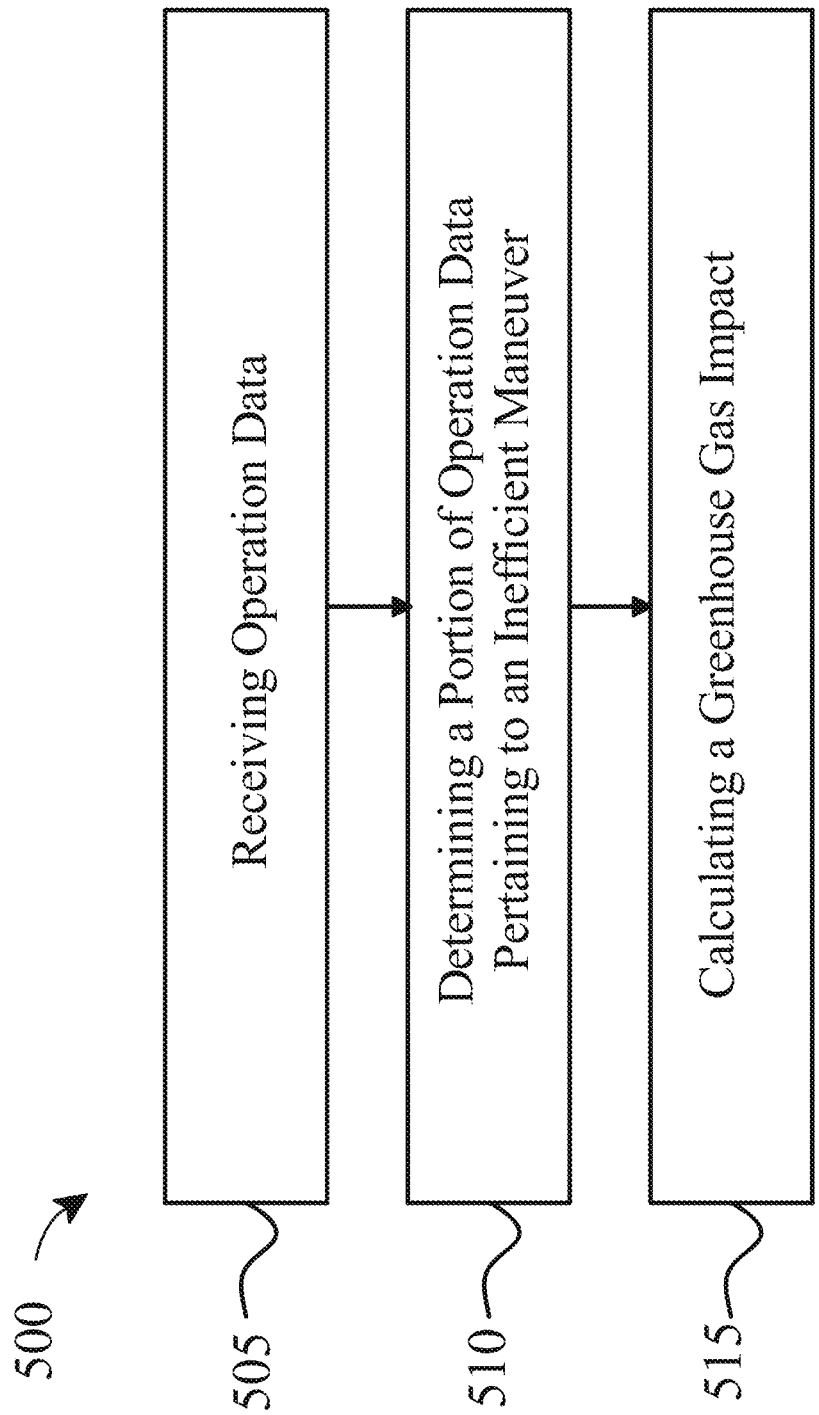
FIG. 5 is a flow diagram illustrating an exemplary workflow in one embodiment of the present invention.

Referring now to FIG. 5, an exemplary embodiment of method 500 is shown. Method 500 includes a step 505 of receiving operation data. Operation data may include an operator maneuver data. Operation data may include transport data. Transport data may include data as a function of time over a course of a transport. This may be implemented as disclosed with reference to FIGS. 1-4.

Still referring to FIG. 5, method 500 includes a step 510 of determining a portion of operation data pertaining to inefficient maneuver. Determining the portion of operation data pertaining to the inefficient maneuver may include classifying each of the operation data to maneuver efficiency category. Determining the portion of operation data pertaining to the inefficient maneuver may include determining the portion of the maneuver efficiency category. The portion of the operation data pertaining to the inefficient maneuver may be determined using a maneuver machine-learning model. The inefficient maneuver may include long idling. The inefficient maneuver may include a large increase in throttle percent. This may be implemented as disclosed with reference to FIGS. 1-4.

Still referring to FIG. 5, method 500 includes a step 515 of calculating a greenhouse gas impact for the inefficient maneuver. The greenhouse gas impact may include a greenhouse gas emission datum. The greenhouse gas emission datum may include a carbon emission datum. The greenhouse gas impact for the inefficient maneuver may be calculated using an impact machine-learning model. This may be implemented as disclosed with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
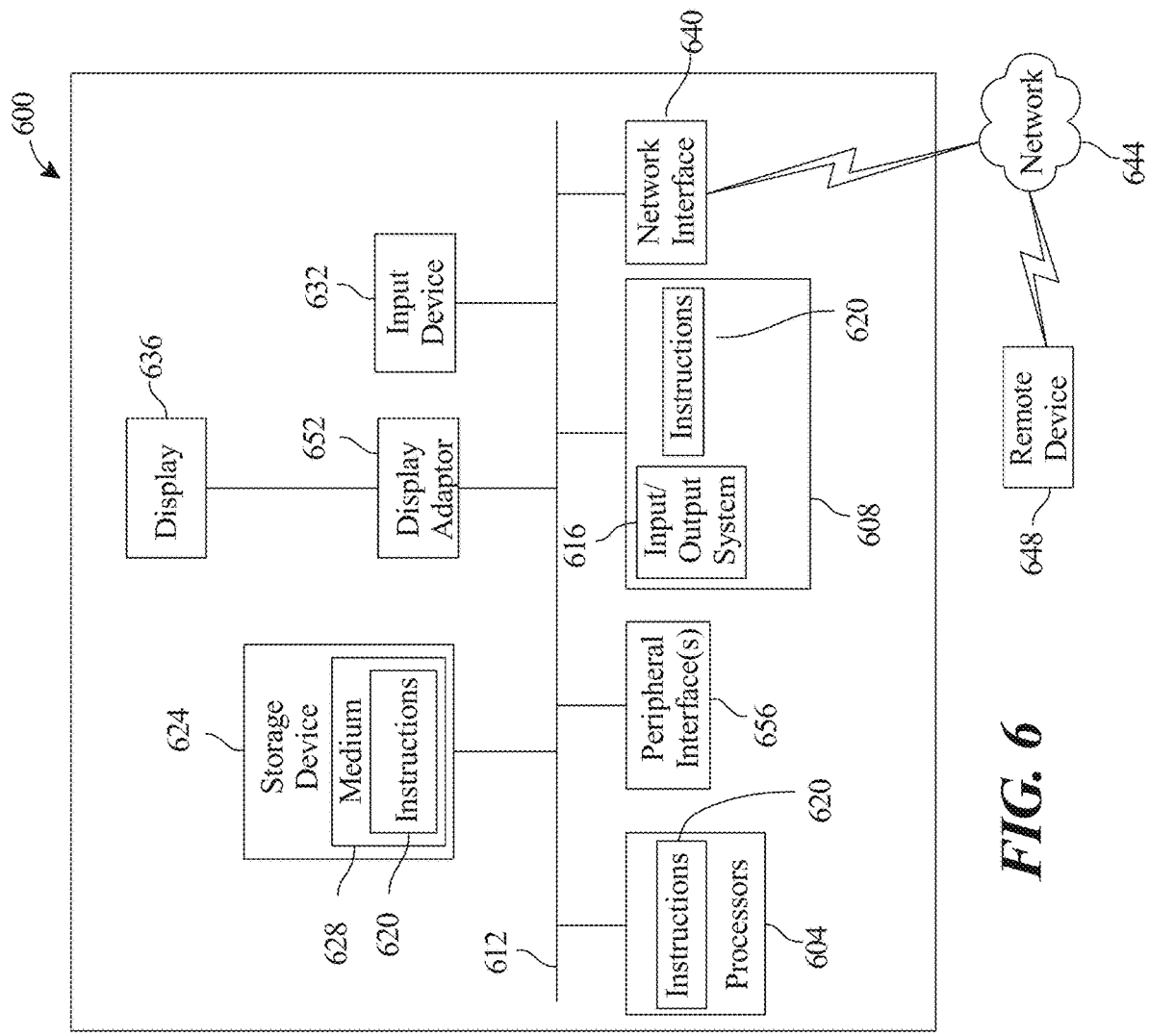
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a greenhouse gas impact of operator maneuvers, the apparatus comprising:
   at least a sensor;
   at least a processor; and
   a memory communicatively connected to the at least a processor, the memory containing instructions configuring the at least a processor to:
      receive operation data detected by the sensor comprising a pressure sensor;
      determine a portion of the operation data pertaining to an inefficient maneuver wherein determining the portion of the operation data comprises:
         classifying each of the operation data to maneuver efficiency category;
         determining an average of the operation data for each maneuver efficiency category;
         determining a threshold value for the inefficient maneuver as a function of the average of the operation data for each maneuver efficiency category; and
         determining the portion of the operation data pertaining to the inefficient maneuver as a function of the maneuver efficiency category and the threshold value for each maneuver efficiency category; and calculate a greenhouse gas impact for the inefficient maneuver data, wherein calculating the greenhouse gas impact for the inefficient maneuver comprises:

receiving a training data set, wherein the training data set comprises outputs correlated with inputs, wherein the inputs comprise inefficient maneuver data inputs and the outputs comprise greenhouse gas impact outputs; and generating an impact machine-learning model as a function of the training data set, wherein the impact machine-learning model determines a greenhouse gas impact as a function of the inefficient maneuver data; and calculating the greenhouse gas impact for the inefficient maneuver using the trained impact machine-learning model.

2. The apparatus of claim 1, wherein the operation data comprises an operator maneuver data.

3. The apparatus of claim 1, wherein the operation data comprises transport data.

4. The apparatus of claim 3, wherein the transport data comprises data as a function of time over a course of a transport.

5. The apparatus of claim 1, wherein the inefficient maneuver comprises long idling.

6. The apparatus of claim 1, wherein the inefficient maneuver comprises a large increase in throttle percent.

7. The apparatus of claim 1, wherein determining the portion of the operation data pertaining to the inefficient maneuver comprises:

receiving a training data set, wherein the training data set comprises outputs correlated with inputs, wherein the inputs comprise operation data inputs and the outputs comprise inefficient maneuver data outputs; and generating a maneuver machine-learning model as a function of the training data set, wherein the maneuver machine-learning model determines the inefficient maneuver data as a function of the operation data.

8. The apparatus of claim 1, wherein the greenhouse gas impact comprises a greenhouse gas emission datum.

9. The apparatus of claim 8, wherein the greenhouse gas emission datum comprises a carbon emission datum.

10. A method for determining a greenhouse gas impact of operator maneuvers, wherein the method comprises:

receiving, using at least a processor and a sensor, operation data detected by the sensor comprising a pressure sensor;

determining, using the at least a processor, a portion of the operation data pertaining to an inefficient maneuver wherein determining the portion of the operation data comprises:

classifying each of the operation data to maneuver efficiency category;

determining an average of the operation data for each maneuver efficiency category;

determining a threshold value for the inefficient maneuver as a function of the average of the operation data for each maneuver efficiency category; and determining the portion of the operation data pertaining to the inefficient maneuver as a function of the maneuver efficiency category and the threshold value for each maneuver efficiency category; and calculating, using the at least a processor, a greenhouse gas impact for inefficient maneuver data, wherein calculating the greenhouse gas impact for the inefficient maneuver comprises:

receiving a training data set, wherein the training data set comprises outputs correlated with inputs, wherein the inputs comprise inefficient maneuver data inputs and the outputs comprise greenhouse gas impact outputs; and generating an impact machine-learning model as a function of the training data set, wherein the impact machine-learning model determines a greenhouse gas impact as a function of the inefficient maneuver data; and calculating the greenhouse gas impact for the inefficient maneuver using the trained impact machine-learning model.

11. The method of claim 10, wherein the operation data comprises an operator maneuver of a transport vehicle.

12. The method of claim 10, wherein the operation data comprises transport data.

13. The method of claim 12, wherein the transport data comprises data as a function of time over the course of a transport.

14. The method of claim 10, wherein the inefficient maneuver comprises long idling.

15. The method of claim 10, wherein the inefficient maneuver comprises a large increase in throttle percent.

16. The method of claim 10, wherein the at least a processor is configured to becomes:

receiving a training data set, wherein the training data set comprises outputs correlated with inputs, wherein the inputs comprise operation data inputs and the outputs comprise inefficient maneuver data outputs; and generating a maneuver machine-learning model as a function of the training data set, wherein the maneuver machine-learning model determines the inefficient maneuver data as a function of the operation data.

17. The method of claim 10, wherein the greenhouse gas impact comprises a greenhouse gas emission datum.

18. The method of claim 10, wherein the greenhouse gas emission datum comprises a carbon emission datum.

* * * * *